United States Patent
Wieczorek (10) Patent No.: US 10,735,969 B2
(45) Date of Patent: Aug. 4, 2020

(54) 600 MHZ SPECTRUM ACCESS SYSTEMS AND METHODS

(71) Applicant: T-Mobile USA, Inc., Bellevue, WA (US)

(72) Inventor: Christopher Alex Wieczorek, Fairfax, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/902,610

(22) Filed: Feb. 22, 2018

(65) Prior Publication Data

US 2019/0261188 A1    Aug. 22, 2019

(51) Int. Cl.
| | |
|---|---|
| *H04W 16/14* | (2009.01) |
| *H04B 1/713* | (2011.01) |
| *H04B 1/715* | (2011.01) |
| *H04B 1/7083* | (2011.01) |
| *H04W 72/04* | (2009.01) |

(52) U.S. Cl.
CPC ............ *H04W 16/14* (2013.01); *H04B 1/713* (2013.01); *H04B 1/7083* (2013.01); *H04B 2001/7154* (2013.01); *H04W 72/048* (2013.01); *H04W 72/0453* (2013.01)

(58) Field of Classification Search
CPC .. H04W 16/14; H04W 72/0453; H04B 1/713; H04B 1/7083; H04B 2001/7154
See application file for complete search history.

(56) References Cited

U.S. PATENT DOCUMENTS

2002/0177444 A1* 11/2002 Nagato ............. H04M 15/8044
455/446
2012/0094706 A1* 4/2012 Fukumoto ........... H04W 72/048
455/512

* cited by examiner

*Primary Examiner* — Erica Navar
(74) *Attorney, Agent, or Firm* — Lee & Hayes, P.C.

(57) ABSTRACT

Systems and methods for utilizing secondary frequency spectrums for increased throughput. When faced with a shortage of primary cellular frequencies, a base station in a cellular network can determine whether secondary frequency spectrum, such as 600 MHz spectrum, frequencies are available. The 600 MHz frequencies can include frequencies licensed to the provider and frequencies licensed to other providers that can nonetheless be used under FCC "Whitespace" rules. Thus, the system can determine whether licensed ("Tier(2)") or unlicensed ("Tier(3)") 600 MHz frequencies are available. Tier(2) frequencies can essentially be used in the normal manner—e.g., at normal power levels and emissions patterns. Tier(3) frequencies can be used under the Whitespace rules. The system can then provide these 600 MHz frequencies to capable user equipment (UE). The system can also prioritize frequencies based on UE capabilities, location, and other factors.

20 Claims, 7 Drawing Sheets

600 MHZ SPECTRUM ACCESS SYSTEMS AND METHODS

BACKGROUND

The proliferation of devices that communicate within the same bands of frequencies has created scarcity within these bands. Cellular communications devices such as, for example, cell phones, smart phones, and cellular enabled tablets (collectively, user equipment, or "UE"), communicate within several frequency bands designated for 2G, 3G, and 4G LTE communications. At any one time, several hundred or thousand UEs may be connected to a cellular base station, or "cell tower," with each UE using a different set of at least two frequencies—e.g., at least a separate upload and download frequency for each UE. Some devices may use additional frequencies to further separate voice from data, internet browsing from live streaming, or to aggregate different frequencies to provide higher throughput to the UE.

Due to limitations in transceiver sensitivity and the nature of radio frequency ("RF") communications, however, these frequency bands can only be divided into a finite number of individual frequencies. In other words, if the disparate uses of frequencies are too close together, then cross-talk and harmful interference can result. This can, at best, lower quality of service (QoS) and, at worst, prevent effective communication altogether. Thus, separating these uses of the RF spectrum by some degree of separation (either in frequency or geographic separation) may is required to prevent the aforementioned interference.

The Federal Communications Commission, or FCC, designates the acceptable uses for various frequency ranges in the applicable RF spectrum. The Cellular Radiotelephone (Cellular) Service, designated by the FCC in 1981, for example, operates using the 824-849 MHz and 869-894 MHz spectrum range. Other ranges are designated for military use only, navigation, and amateur radio use, among other things. These ranges, coupled with the limitations of current transceiver technology, create a severe shortage of usable frequencies for the purposes of cellular voice and data communications.

The FCC initially designated the 470-698 MHz portion of the RF spectrum for Ultra High Frequency ("UHF") television service. Television broadcasters hold television licenses composed of 6 MHz of spectrum, which is used for broadcasting television service to consumer television sets. In 2012 Congress instructed the FCC to hold a first of its kind "incentive auction" where television broadcasters could surrender their licenses to the FCC in return for compensation in order to provide more spectrum for mobile broadband services through a repacking process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As mentioned above, for decades, the FCC designated the 470-698 MHz portion of the RF spectrum for Ultra High Frequency ("UHF") television service. UHF Television broadcasters hold television licenses composed of 6 MHz of spectrum. These licenses (and spectrum) are used for broadcasting television service to consumer television sets. To prevent harmful interference among television broadcasters, these television license are separated both in spectrum (e.g., channels 40, 41, 42, etc.) and geographically (e.g., channel 40 is used in Washington, D.C. but not Baltimore). This geographical and frequency spacing is typically referred to as "Whitespace".

Recognizing that over the air television broadcasting may not be the highest priority or best use of this scarce resource, in 2012 Congress instructed the FCC to hold the "incentive auction," where television broadcasters could surrender their licenses to the FCC in return for compensation in order to provide more spectrum for mobile broadband services through a repacking process.

The incentive auction comprised two parts. A "reverse auction" where television licensees competed against each other to surrender their licenses. And a "forward auction" where parties interested in mobile broadband (e.g., cellular service providers) competed against each other to purchase licenses for the relinquished spectrum. The FCC served as a middleman and broker between the two auctions, recovering the arbitrage for the U.S. Treasury.

In order to make the relinquished spectrum useful for mobile broadband, the television broadcasters that did not surrender their licenses had to be "repacked," or moved out of the spectrum now available for mobile broadband spectrum. This enables the mobile broadband spectrum to be substantially free and clear of harmful interference from television broadcasting and enables 4G and 5G technologies, like Long Term Evolution ("LTE") transmissions, among other things. The incentive auction that ended in April 2016 yielded 70 MHz of usable mobile broadband spectrum, now known as the "600 MHz spectrum"—specifically 617-652 MHz and 663-698 MHz. Repacking of the 600 MHz spectrum is estimated to take over three years. During this interval of time, television broadcasters destined to be repacked are permitted to continue operating as usual. Moreover, the abovementioned Whitespace continues to exist in the 600 MHz spectrum and in fact, is increased because a handful of television broadcasters surrendered their licenses and went off the air. This is especially true in major cities or in rural areas between major cities.

As mentioned above, for various reasons, there is a severe shortage of frequencies that are available for cellular voice and data communications. As a result, in heavily congested areas such as, for example, large urban centers, stadiums, and convention centers, users may be unable to complete calls or connect to the Internet, among other things. This may be because the local base station (e.g., a cell tower, microcell, femtocell, etc.) is overloaded from a traffic standpoint and simply cannot handle additional connections. But this may also happen simply because the base station does not have any additional upload/download frequency pairs available because they are all in use. And while upgrades to the software and/or hardware of the base station may be possible to increase throughput (e.g., the number of calls that can be handled simultaneously), this does make additional frequency spectrum available to the base station.

To this end, examples of the present disclosure can comprise systems and methods for utilizing previously unused portions of the frequency spectrum. The system can use the Whitespace to utilize the 600 MHz frequency spectrum—even when portions of that spectrum have been licensed to others. As discussed below, by following various Whitespace rules, this frequency spectrum can be used for cellular voice and data communications, with little to no additional cost to the cellular provider and without harming over the air consumers.

Examples of the present disclosure are described below as a system for exploiting the newly available 600 MHz spectrum using a number of different methods. One of skill in the art will recognize, however, that the disclosure is not so limited. In other words, while described for use with a particular spectrum (600 MHz), similar methods could be used to exploit other bands of spectrum with similar usage rules. Thus, the discussion below of the recently licensed 600 MHz spectrum is intended to be exemplary and not limiting.

The 600 MHz spectrum is a part of the radio spectrum that is being repurposed from several legacy uses to be exclusively used for licensed mobile wireless technology. Two of the legacy uses of this band are full power digital television (DTV) broadcasting and Whitespace operations. Full power television service is the "primary" service, meaning it is fully protected from interference. These TV stations have FCC defined "service contours," or areas where the TV station is presumed to serve, based on the TV station's location and technical parameters. TV stations operating on the same or even adjacent channels, or frequencies, are geographically separated to prevent interference.

Whitespace operations are considered a "secondary" service and are interspersed among these TV stations. These Whitespace devices are able to operate outside of the interference protected service contours. An apparatus using this method can take advantage of certain FCC service rules, or Whitespace rules, to gain access to otherwise licensed 600 MHz spectrum without needing an FCC license. See, e.g., https://www.fcc.gov/general/white-space.

Examples of the present disclosure, therefore, can comprise the creation and utilization of a database of frequencies, rules, and related implementation methods involving the interplay between the FCC's rules for 600 MHz spectrum, digital TV service, the technical capabilities of existing 600 MHz radios, and the Whitespaces.

At present, the 600 MHz spectrum includes a plurality of users in a plurality of categories. DTV is the primary legacy user in the 600 MHz spectrum. Various TV stations, approximately 500 of them, have protection from interference from 600 MHz licensees (e.g., cellular providers) until July of 2020. These stations are gradually being "repacked" into remaining spectrum outside of the 600 MHz spectrum. During the three-year repacking period, however, other users are not allowed to cause interference to DTV stations.

After the TV stations have been repacked, 600 MHz licenses are permitted to use the 600 MHz spectrum for Long Term Evolution (LTE), and other, services.

The next category is 600 MHz licensees, which include wireless broadband providers who purchased spectrum licenses at auction. Approximately 3000 licenses were issued by the FCC in the 600 MHz auction to several dozen different licensees (mostly cellular service providers). These licenses give exclusive rights to use spectrum, subject to certain conditions, as discussed below. Most of this spectrum will likely be used for 4G LTE broadband but some providers may also use the spectrum for narrowband 5G, among other things.

The next class of users includes various secondary television related services, including television translators, low power television licenses, broadcast auxiliary links (e.g., wireless connections between the studio and the actual television transmission antenna), and wireless microphone licensees among others. This motley category is secondary to both the DTV and 600 MHz licensee categories. These licensees are secondary to 600 MHz licensees, but only when the 600 MHz licensee is ready to "commence service" in the area it holds a 600 MHz license. These licensees receive notices of commencement of operations ("NCOs") from 600 MHz licensees, requiring them to vacate the spectrum within 90 days of reception of the NCO. Thus, until a 600 MHz licensee is actually ready to start using the spectrum in a particular licensed area, the secondary television related services have access the spectrum.

The next class of user includes Whitespace services. This is a secondary service across the entire 600 MHz spectrum. Whitespace devices, however, must operate in such a way that they do not cause interference to DTV stations and are subject to a host of technical limitations (e.g., transmission power limits) to prevent this interference. Like the secondary television related services, Whitespace service is secondary to 600 MHz licensees but only when the 600 MHz Licensee is ready to "commence service," as evidenced by reception of an NCO. This commence service requirement is notable because until 600 MHz licensees are actually ready to start using the spectrum in a particular licensed area, Whitespace devices also have access to the spectrum.

To utilize this previously-untapped spectrum, therefore, it is useful to have an up-to-date database including the 600 MHz spectrum and dividing the frequencies into a plurality of "tiers." The tiers can include three levels of use—no use (Tier(1)), unrestricted use Tier(2)), and Whitespace use (Tier(3)). Tier (1) can include those frequencies that cannot be used at present, including 600 MHz frequencies that are currently in use by DTV and 600 MHz frequencies for which another provider has filed an NCO. Tier (1) can nonetheless be updated over time as DTV is repacked into other frequencies, for example, or stations cease operations. Tier (1) can also include those 600 MHz frequencies for which (1) there is no DTV, (2) the provider does not own the license, but (3) the licensee has filed an NCO. These frequencies are not available for use, because the licensee is protected from interference.

Tier(1) can also include those 600 MHz frequencies for which (1) there is no DTV, (2) there is secondary television related service, (3) the provider does not own the license, and (4) the provider does not own an adjacent frequency. These frequencies cannot be used because the secondary television related service is protected from interference on these frequencies. As discussed below, however, Whitespace use, or Tier(3), is possible if the provider has a license for an adjacent frequency.

Tier(2) can include 600 MHz frequencies for which there is no DTV and the provider has a license. As discussed above, this is the most desirable of the 600 MHz frequencies (though perhaps not as desirable as the primary cellular frequencies) because these frequencies can be used at "normal" power levels. Because there are no competing uses, the provider is free to use these frequencies without any extraordinary restrictions on use (i.e., similar restrictions as those for the primary frequencies, but no additional restrictions as in Whitespace use).

Tier (3) can include those 600 MHz frequencies for which (1) there is no DTV, (2) there is no secondary television related service, (3) the provider does not own the license, but (4) the licensee has not filed an NCO. As discussed below, these frequencies can be used, but Whitespace rules are implicated. Similarly, Tier (3) can also include frequencies for which (1) there is no DTV, (2) the provider does not own the license, (3) the licensee has not filed an NCO (4) there is a secondary television service preventing use of the Whitespace rules, but (5) the provider has a license in an adjacent portion of the 600 MHz spectrum. In this case, the licensee can force the secondary television service to cease operations under the FCC rules by filing an NCO for the adjacent frequency. As discussed below, these frequencies can also be used, but Whitespace rules are implicated.

At this time, Tier(1) includes DTV and, due to interference regulations, cannot practically be used within the geographic area of the respective DTV station. Of course, these same frequencies may be usable in another geographical area that is sufficiently distant from the DTV station. In other words, a frequency that is not available in Atlanta, Ga., for example, may be available in Savannah, Ga. because Atlanta and Savannah are far enough apart to prevent interference. Use of Tier(1) can also be precluded because the licensee has filed an NCO and, therefore, is also protected from interference, as discussed above. The combinations associated with each Tier are shown below in Table 1:

| DTV? | License? | NCO? | Secondary TV? | Adjacent Frequency? | Use | Tier |
|---|---|---|---|---|---|---|
| Yes | — | — | — | — | None | 1 |
| No | Yes | Yes (provider) | — | — | Full | 2 |
| No | No | Yes (license) | — | — | None | 1 |
| No | No | No | No | — | Whitespace | 3 |
| No | No | No | Yes | Yes | Whitespace | 3 |
| No | No | No | Yes | No | None | 1 |

Figure 1A:
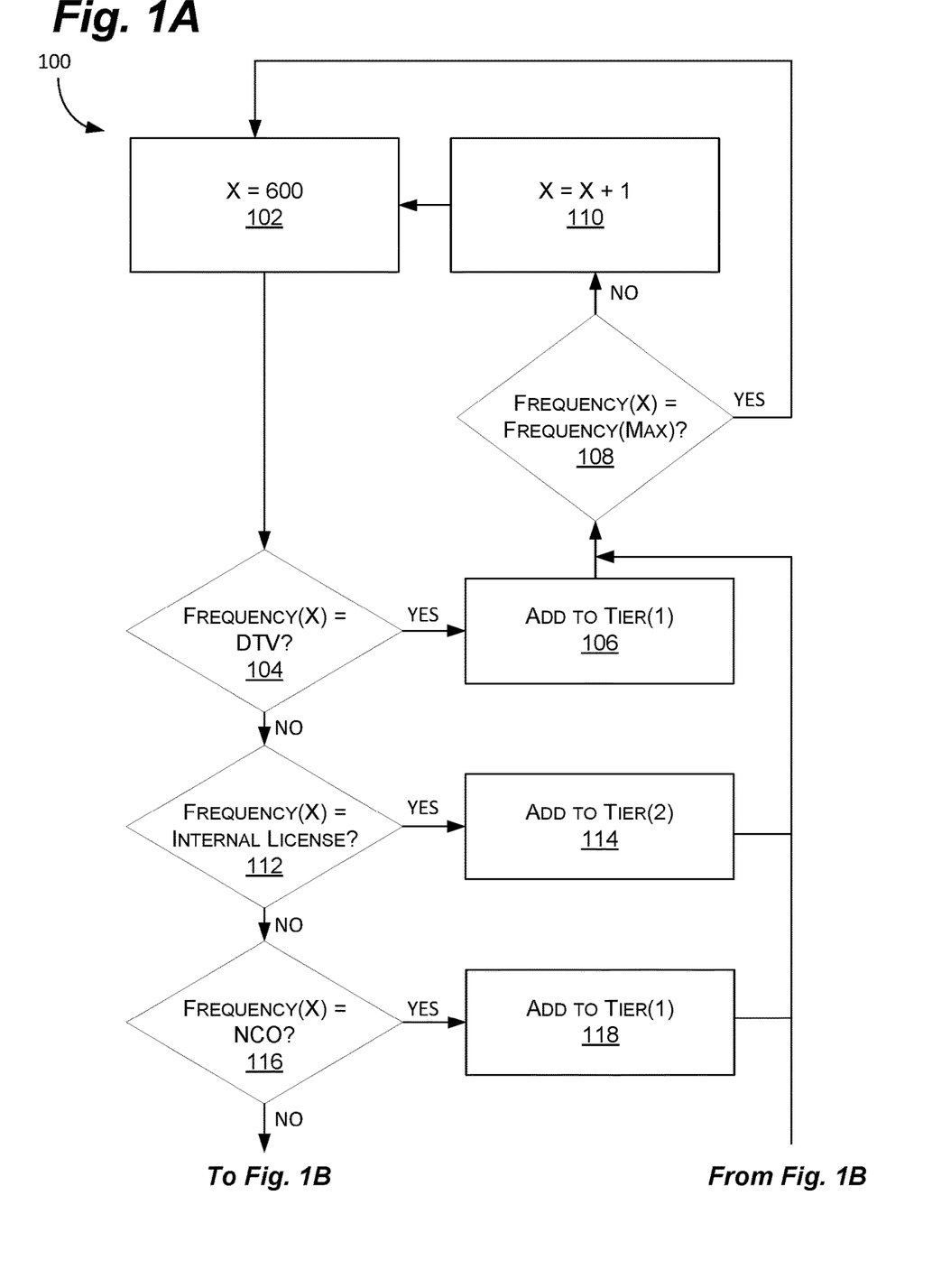
FIGS. 1A and 1B are flowcharts depicting an example of a method for classifying frequencies in a frequency database, in accordance with some examples of the present disclosure.
Figure 1B:
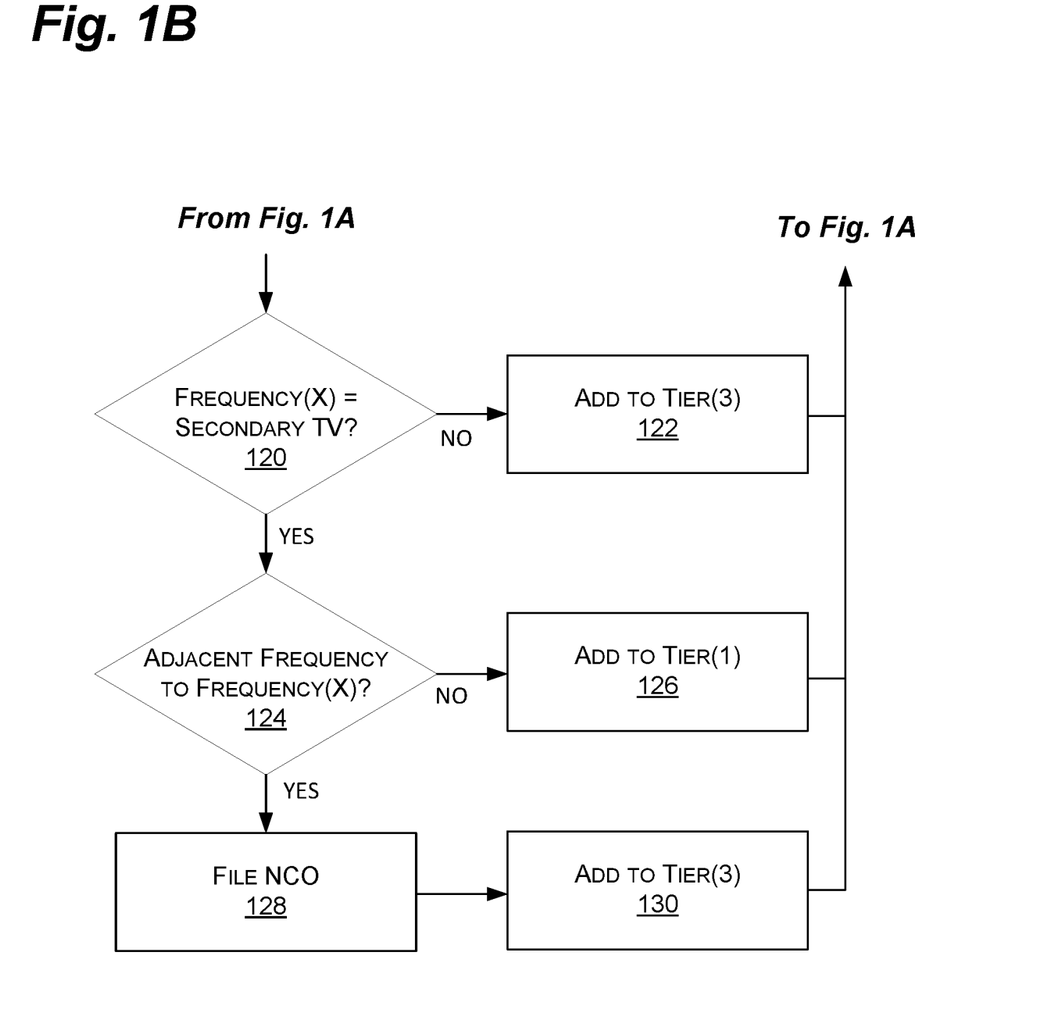

As shown in FIG. 1, therefore, a method 100 can be devised to first compile a database of available frequencies within the 600 MHz spectrum in a particular area. As mentioned above, the database can be compiled in different geographical areas to account for differences in use (e.g., DTV) and licensing from place to place. Thus, a provider may compile different databases in different states, cities, etc., such that they are substantially geographically isolated (though they may overlap somewhat). For a particular service provider, therefore, the various frequencies (or frequency blocks) in the 600 MHz spectrum can be divided into the three basic tiers—no use, full use, and Whitespace use—only the latter two of which are useful for the systems and methods described herein.

Thus, the first tier includes those frequencies that are still being used by DTV or for which an NCO has been filed by the licensee. Because DTV has priority for the time being, these frequencies cannot be used within a particular geographic area regardless of whether the provider has a license or not. Thus, a provider may have a band of frequencies that cannot be used until the repacking operations, discussed above, are complete.

The second tier includes frequencies in the 600 MHz band for which the provider has a license and no DTV stations are operating. In this case, the provider is free to use this portion of the spectrum in the "normal" manner—i.e., subject to normal cellular communications regulations—and is not required to observe the Whitespace rules. Thus, the provider may be able to use these frequencies at "normal" power levels (i.e., the same power levels used in primary cellular frequency bands) and using normal antennas and other equipment. As time progresses, and DTV is repacked, however, substantially the entire 600 MHz spectrum will be available in the normal manner to at least one provider.

Significantly, however, in the meantime, examples of the present disclosure also include systems and methods configured to exploit the third tier of frequencies. These frequencies include those which (1) the provider does not have a license, (2) there is no DTV, (3) there is no secondary television service, and (4) no NCO has been filed by the licensee. These frequencies include those which (1) the provider does not have a license, (2) there is no DTV, (3) there is secondary television related service, (4) no NCO has been filed by the licensee, and (5) the provider can file an NCO in an adjacent frequency. In this tier, the spectrum can be used utilizing the FCC Whitespace rules. In other words, by reducing transmission power levels and/or emission patterns from the UE, among other things, these previously unusable frequencies can be exploited despite the fact that another provider actually owns the license for the frequencies.

To this end, FIGS. 1A and 1B depict an exemplary method 100 for compiling a frequency database. The method 100 can be performed by a technician—e.g., by reviewing FCC filings, direct communications with the television stations, and other sources—or can be computer implemented. The method 100 can be executed monthly, daily, hourly, or whenever relevant to maintain an up-to-date database. The database can be updated as, for example, DTV stations are repacked, licenses are acquired (or otherwise change hands), or as NCOs are filed.

At 102, therefore, a counter, X, can be set to 1 and can be associated (e.g., in a table) with the lowest frequency in the 600 MHz spectrum. In this case, X can be associated in the table with 617.0 MHz, for example, the lowest frequency of concern under the Whitespace rules. But in other schemes this value may be 590 MHz, or some other value, depending on the available local spectrum. Indeed, the same method 100 can be used in other frequency spectrums that are, or may become, governed by similar rules. To this end, this disclosure refers to the 600 MHz spectrum, but the systems and methods described herein could be used for other similar frequency bands if, and when, they become publicly available.

At 104, the method 100 can determine if the selected frequency, in this case 617.0 MHz, is currently in use by a DTV station. In some examples, this information can be gleaned from an FCC list of DTV licenses. In other examples, a technician or computerized tuner can simply scan the 600 MHz spectrum for DTV stations—e.g., similar to "channel scan" on a digital television. As mentioned above, those channels still in use by DTV cannot be used until they have been relocated in the spectrum (subject to the adjacent frequency exception discussed below).

Of course, this restriction is geographically limited. In other words, this particular frequency may not be available within a predetermined distance (e.g., 25, 50, or 100 miles) of the DTV station to avoid interference. But, while a frequency may not be available in one location, it may be available in another location where this frequency is not in use by a DTV station. To this end, the database can be compiled for each city, area code, base station, or other unit to account for geographical differences.

When the frequency is in use by a DTV station in a particular geographical area, at 106, this frequency can be added to Tier(1)—those frequencies that cannot currently be used. As mentioned above, however, these frequencies can be revisited periodically as, for example, DTV stations and secondary television services are relocated in the spectrum or become inactive. As these services are repacked, new frequencies may become available for Tier(2) or Tier(3) use, as discussed below.

At 108, the method 100 can then determine if all of the frequencies in the 600 MHz spectrum have been assessed—e.g., if Frequency(X)=Frequency(Max). In this case, Frequency(Max) is 698.9 MHz, but could be some other frequency depending on the available frequency spectrum in a particular location. If all frequencies have been checked (e.g., Frequency(X)=Frequency(Max)), then the method 100 can end, restart, or restart after a predetermined amount of time (e.g., after one hour, one day, one week, one month, etc.).

When all frequencies have not been checked, then at 110 the counter can be incremented by one (i.e., X=X+1) to move to the next frequency in the table. The division, or step, associated with the increment in frequency can be dependent on current transceiver technology, for example, licensing, or other factors. The increment can be based, for example, on the amount of separation required between frequencies to prevent interference. At present, the spectrum is generally divided into 100 KHz increments, but other increments could be used. In this case, therefore, Frequency (1) can be 617.0 MHz, Frequency(2) can be 617.1 MHz, Frequency(3) can be 617.2 MHz, etc. for the entire 600 MHz Band.

If, on the other hand, the current frequency, Frequency(X) (in this case 617.0 MHz) is not in use by a DTV station or secondary television related service, the method 100 moves to block 112 to determine if the provider has a license for Frequency(X) for which the provider has filed an NCO. If so, Frequency(X) can be added to Tier(2) at block 114. As mentioned above, Tier(2) includes those frequencies that can be used without restrictions beyond the normal FCC restrictions for mobile broadband frequencies. Thus, Tier(2) can be used at normal power levels and emissions patterns without additional modifications to the transceiver or UE. As a result, Tier(2) is the next most desirable set of frequencies below the normal cellular frequencies.

All of the frequencies in the 600 MHz spectrum were sold in the above-mentioned auction, so it is either licensed to the provider or another licensee. Thus, if Frequency(X) is not licensed to the particular provider, then the provider can assume that the frequency has been licensed to a competitor or, in rare cases, not licensed and held by the FCC regardless of whether it is in use by DTV.

At 116, therefore, the method 100 can determine if an NCO has been issued for a licensee for that frequency. In some case, the licensee may simply not be ready to commence operations and thus, has not filed the NCO yet. In those rare cases where the license was unsold at the auction and held by the FCC, the provider can also determine that an NCO has not issued.

When an NCO has been filed by the licensee, at 118, Frequency(X) can be added to Tier(1)—those frequencies that cannot be used. As mentioned above, because the licensee has filed an NCO, they are protected from interference under the FCC rules.

When no NCO has been filed by the licensee, on the other hand, at 120, the method 100 can next determine if there are any secondary television related services in use on Frequency(X). In some examples, this information can be gleaned from an FCC list of secondary television service licenses. In other examples, a technician or computerized tuner can simply scan the 600 MHz spectrum for secondary television service. As mentioned above, those channels still in use by secondary television service cannot be used until they have been relocated in the spectrum (subject to the adjacent frequency exception discussed below).

When no secondary television related services are in use on Frequency(X), at 122, Frequency(X) can be added to Tier(3). Again, Tier(3) includes those frequencies that can be used, but under the Whitespace rules. Thus, the frequency can be used for communications by a UE, but the UE may have to reduce transmission power, for example, or alter emissions patterns or other parameters to conform to the rules. As a result, Tier(3) is the third most desirable tier below normal frequencies and licensed 600 MHz frequencies.

Tier(3) frequencies may be somewhat less desirable due to the potentially lower power levels and/or propagation distances. Reducing power levels naturally reduces propagation distance at a given frequency. However, the 600 MHz spectrum has inherently longer propagation distances than other (higher) frequencies used for mobile broadband services. In addition, in urban areas or situations where the UE is in close proximity to the base station, the reduced power and/or waveform changes may be of little consequence. In a crowded stadium or airport, for example, the UE may be only tens or hundreds of feet from the base station.

When no NCO has been filed by another licensee, there is no DTV station, but there is secondary television related service, then, at 124, it is possible to determine if there is an adjacent frequency that is licensed to the provider that is distinct from Frequency(X), but that is close enough in spectral or geographic adjacency to the secondary television related service to enable the provider to issue an NCO based on the adjacent. This has the effect of clearing the impediment to using Frequency(X) by superseding the use by secondary television related service. These rules are based on distances, frequency spacing, etc. and are outlined in the Whitespace rules provided by the FCC.

When the provider does not have a suitable adjacent frequency, at 126, Frequency(X) can be added to Tier(1)—those frequencies that cannot be used by the provider. In this case, the use of Frequency(X) is precluded by the secondary television related service, which is protected under FCC rules from interference. Of course, these frequencies can also be rechecked periodically as secondary television related services are repacked into other spectrums.

When the provide does have a suitable adjacent frequency, on the other hand, an NCO can be filed by the provider for the adjacent frequency at block 128. Once filed, the secondary television related services are superseded by the NCO. At 130, therefore, Frequency(X) can now be added to Tier(3), and is available for use under the Whitespace rules, but subject to the adjacent frequency also being used to comply with the NCO. After each frequency has been added to the appropriate tier, at 108, the method 100 can again determine if all frequencies have been checked (i.e., if Frequency(X)=Frequency (Max)). When all frequencies have not yet been check, at 110, the counter (an associated frequency) can be incremented by one and the next frequency can be checked (e.g., 617.1 MHz). The method 100 can continue iteratively until all frequencies have been checked. As mentioned above, the 600 MHz spectrum can be checked weekly, daily, hourly, or as desired to keep the database up-to-date. The method 100 can be performed manually by a worker, automatically or semi-automatically by a computing device such as, for example, a laptop, desktop, server, or other device.

Figure 2A:
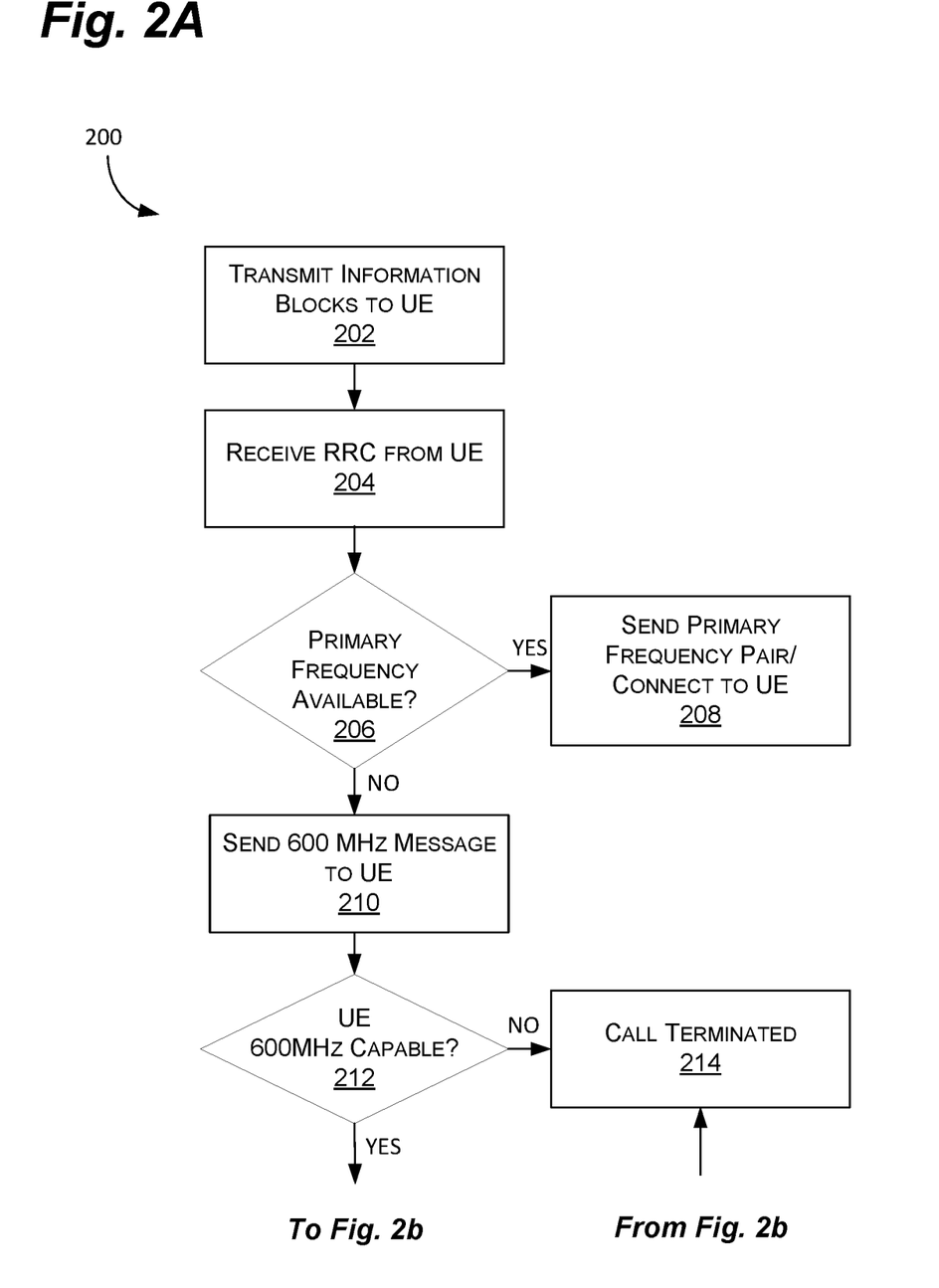
FIGS. 2A and 2B are flowcharts depicting an example of a method of using the 600 MHz spectrum to augment the currently available cellular spectrum from the base station point-of-view, in accordance with some examples of the present disclosure.
Figure 2B:
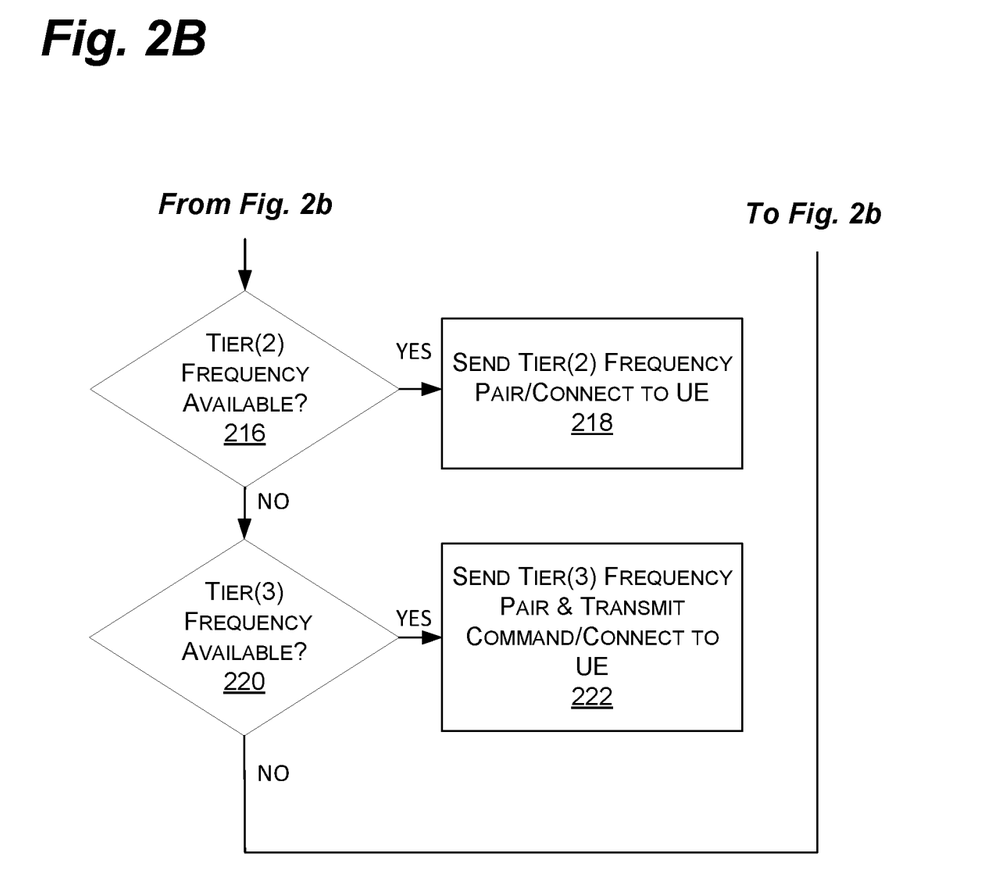

FIG. 2 depicts a method 200 of using the 600 MHz spectrum to augment the currently available mobile broadband spectrum from the base station point-of-view. As mentioned above, the base station can use the 600 MHz spectrum as a fall back, or secondary spectrum, when there are no available frequencies in "primary" spectrums—i.e., those spectrums traditionally reserved for mobile communications such as the Personal Communications Service ("PCS"), Advance Wireless Service ("AWS"), Cellular Service, 700 MHz Service, or Broadband Radio Service ("BRS") bands. Indeed, the method 200 can be used even over those portions of the 600 MHz spectrum that are licensed to other providers by utilizing the aforementioned Whitespace rules. Alternatively, the method 200 can be used to provide carrier aggregation among the primary and 600 MHz spectrums to increase throughput.

At 202, the base station can transmit a series of Master Information Block ("MIB") and System Information Block ("SIB") messages to the UE. The messages can define, among other things, what spectrum bands are available for use at the base station. If there are both primary cellular frequency and 600 MHz spectrum pairs, for example, then messages may include both spectrum bands.

At 204, the base station can receive a radio resource control ("RRC") connection request from a UE. This indicates the UE's intent to establish a call. The RRC will also contain UE specific information including the RF bands supported by the UE, among other things.

In a conventional cellular system, the base station would normally either send (1) an RRC Connection Setup message, or (2) an error message indicting that the base station cannot complete the call. In times of high call volume, for example, the base station may not be able to establish a call for the UE simply because there are no available frequencies (or, frequency pairs). In contrast, the method 200 provides additional frequency spectrum from which the base station can choose to connect the UE to prevent the call from failing.

At 206, therefore, the base station can determine if a "primary" frequency pair is available to connect the UE to the base station. So, for a 4G LTE connection, depending on the provider, the primary frequencies could be PCS, AWS, Cellular, 700 MHz, or BRS band for which the provider has a license. Similarly, for 3G (legacy) connections, which can be used as a "fall back" when LTE frequencies are busy, the primary frequencies could be, for example, in the PCS, Cellular, or AWS bands. Thus, the primary frequencies can include 4G LTE, 3G, and 2G cellular frequencies, among others.

If the primary frequency is available, then at 208, the base station can assign a primary frequency pair to the UE in the normal manner. This may be preferable, when available, because the UE can broadcast at normal power levels and emissions patterns, which can improve signal quality and speed and reduce errors, among other things. The primary frequency may also have advantageous propagation characteristics to confine RF emissions and the overall noise floor to minimize inter-cell interference. Thus, when the primary frequency pair is available, it can be assigned to the UE in the normal manner and the method 200 ends.

When no primary frequency pairs are available for use, then at block 210, the base station can send a message to the UE to instruct it to utilize a secondary frequency. The UE must have a transceiver and software (or firmware) capable of transmitting and receiving in the secondary, or 600 MHz, spectrum. As discussed below, this may require a UE with an upgraded transceiver from the factory, a firmware update to an existing transceiver, software patches, or other modifications.

The primary frequencies may be unavailable due to excessive traffic, technical problems, interference, or other issues. Thus, in a stadium during a game or a convention center during a convention, all primary frequencies may simply be in use by other UEs. Using conventional technology in this situation, the UE may not be able to connect and thus, receive an error code, provide a fast busy, etc. In this case, however, the method 200 provides several additional options for the UE to connect to the base station. This can provide improved performance and QoS, particularly in areas dense with users.

At 212, therefore, the method 200 can determine if the UE is capable of using the secondary frequency. This can include a plurality of steps. In some examples, this can include receiving a message from the UE (e.g., an RRC message) indicating whether the UE is technically capable (i.e., has the necessary transceivers, software, etc.) of communicating in the 600 MHz spectrum. In other cases, this can also include determining whether the UE is capable of transmitting and receiving using reduced power levels and/ or modified waveforms. As discussed below, in some examples, the UE must conform to Whitespace rules, which may require various modifications to the UE's transmissions. This may require, for example, transceivers or antennas with increased sensitivity or directionality, modified software or firmware, etc.

In some examples, determining whether the UE can utilize secondary frequencies can also include determining if the UE is within a predetermined distance of the base station. Due to the interference rules regarding legacy broadcast television service within the 600 MHZ spectrum, the UE may need to be within a predetermined distance (e.g., within 5 kilometers) to utilize the 600 MHz spectrum within the FCC's rules. In addition, when adhering to Whitespace rules, the UE may also transmit at reduced power levels (i.e., when compared to normal transmission power levels on primary frequencies), which necessarily reduces propagation distances.

Indeed, in some examples, the system may prioritize frequencies based on the various factors. Thus, the frequencies can be chosen based on the distances of various UE from the base station, the type of service requested (e.g., voice calls vs. internet access), the type of UE, etc. The system may provide primary frequencies to, for example, UE that use older technologies, are farthest away from the base station, or otherwise may need full power transmission. The system can then use Tier(2) frequencies, which may be used at full power, and finally Tier(3) frequencies can be used for UEs that are closer to the base station, since they are likely transmitting at reduced power levels, among other things. Indeed, the system may move UEs from one tier to another as their distance from the base station changes.

When the UE cannot connect to the base station using the 600 MHz spectrum, then at 214, the call process can be terminated in the normal manner. In some examples, this can include the base station sending a message indicating that the RRC cannot be completed. In other examples, after not receiving a frequency pair from the base station for a predetermined amount of time (e.g., 5 or 10 seconds), the UE may simply "time out." In either case, the UE can play a fast busy, for example, or play an error message—e.g., "We're sorry, your call cannot be completed at this time. Please try your call again later."—to inform the user that the call has not gone through.

When the UE is 600 MHz capable—e.g., it is technically capable and close enough to the base station—on the other hand, then at 216, the method 200 can determine if a Tier(2), or a licensed frequency pair in the 600 MHz spectrum, is available. As discussed above, if a Tier(2) frequency pair is available, the UE can use these frequencies essentially as if they were primary frequencies. That is, because there are no active DTV stations and the provider has a license, there are no extraordinary restrictions on their use. In this manner, with the exception of any technical shortcomings of the 600 MHz spectrum (e.g., potentially shorter propagation distances due to lower transmission power levels), Tier(2) is a desirable contingency plan when the primary spectrum is unavailable.

When a Tier(2) frequency pair is available, then at 218, the base station can send an available Tier(2) (i.e., licensed, 600 MHZ) frequency pair to the UE. This can be included in an RRC message, which can also include additional connection information such as, for example, server IP addresses, cryptographic keys, etc. The UE can then connect to the base station using the provided Tier(2) frequencies, avoiding the connection errors discussed above. Indeed, depending on the desired use (e.g., voice call, internet browsing, etc.) the process can be substantially seamless from the user's perspective.

When no primary or Tier(2) frequencies are available (e.g., they are all in use) and the UE is capable of Tier(3) use, then at 220, the base station can next determine if any Tier(3) frequencies are available. As discussed above, these include frequencies for which the provider does not hold a license, but for which no NCO has been filed and frequencies for which the provider has filed an NCO on an adjacent frequency. If Tier(3) frequencies are available (i.e., not already in use), and the UE is within a predetermined distance of the base station, for example, the UE can connect to the base station using the Whitespace rules.

When a Tier(3) frequency is available and the UE is capable of conforming to Whitespace rules, then at 222, the base station can send the appropriate frequency pair and associated instructions in an appropriate SIB message. The associated instructions can include commands to cause the UE to reduce its transmission power, alter its emission pattern, change antennas, etc. to conform with the Whitespace rules. As mentioned above, due to the modifications in transmission power and/or shape, the UE may need to be, for example, within a predetermined distance from the base station, in a position that has a substantially unobstructed path to the base station, free from certain types of interference, etc. for the UE to communicate effectively with the base station.

If no primary, Tier(2), or Tier(3) frequencies are available, then returning to block 214, the base station can terminate the call, send an error message indicating that the call cannot be completed, etc. As before, this may include, for example, the base station sending an error message indicating that the RRC cannot be completed. In other examples, after not receiving a frequency pair from the base station for a predetermined amount of time (e.g., 5 or 10 seconds), the UE may simply "time out." In either case, the UE can play a fast busy, for example, or an error message—e.g., "We're sorry, your call cannot be completed at this time. Please try your call again later."—to inform the user that the call has not gone through.

Thus, the method 200 provides multiple "fallback" positions to enable the base station to establish connections with more UE that would have previously been possible. As mentioned above, to maximize this new bandwidth, the base station may prioritize UE based on distance, signal strength, bandwidth (or, "throughput") requirements, and other factors such that each UE is provided with a usable frequency pair. UEs farther from the base station may receive primary frequencies, for example, while closer UE operate under the Whitespace rules. Of course, only those UEs capable of operating within the Whitespace rules can utilize them, which may provide further opportunities for prioritization/classification.

Figure 3:
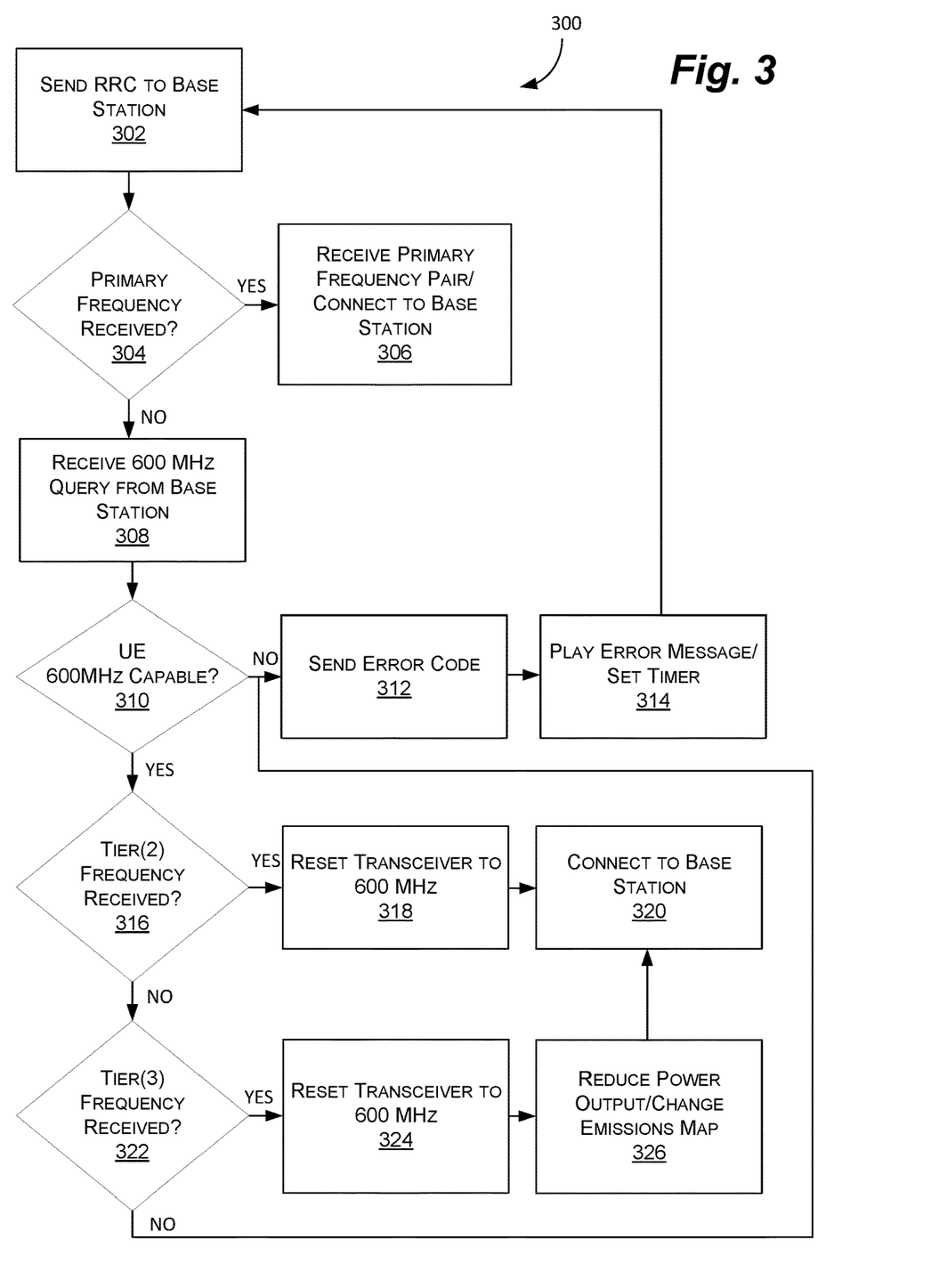
FIG. 3 is a flowchart depicting a method of using the 600 MHz spectrum to augment the currently available cellular spectrum from the user equipment (UE) point-of-view, in accordance with some examples of the present disclosure.

FIG. 3 depicts a method 300 of using the 600 MHz spectrum to augment the currently available mobile spectrum, but from the UE point-of-view. As mentioned above, if the 600 MHz spectrum is needed (e.g., during times of high traffic), the UE can fall back to Tier(2) or Tier(3), as necessary. Of course, the UE must be capable of using the 600 MHz spectrum and, in some cases, other parameters may need to be met (e.g., distance, interference, position, etc.) to conform to Whitespace rules.

At 302, therefore, the UE can send a request to connect to the base station. Thus, the UE can send a RRC message, for example, to the base station. This indicates the UE's intent to establish a call and may also include the frequencies at which the UE is capable of operating.

At 304, the UE can determine if a primary frequency pair has been received from the base station. This may be sent, for example, as a SIB message from the base station including the primary frequency pair and other relevant information to enable the UE to connect to the base station. The information received may depend on, for example, whether the UE is attempting to establish a voice call, internet connection, etc. When a primary frequency is received, then at 306, the UE can use the information provided in the SIB message to connect to the base station in the conventional manner and no fallback procedures are required.

When no primary frequencies are available, on the other hand, instead of receiving the primary frequency pair, at 308, the UE can instead receive a message from the base station asking whether the UE is capable of using the 600 MHz spectrum—e.g., whether the UE is "600 MHz capable." This can include a specific SIB message, for example, that (1) indicates to the UE that no primary frequencies are available and (2) requests an answer from the UE. Obviously, if the UE is not physically capable of transmitting and receiving in the 600 MHz spectrum (e.g., the transceiver simply does not operate at these frequencies), then it may simply have to wait for an available primary frequency pair, as discussed below.

At 310, the UE can determine whether it is capable of using the 600 MHz spectrum. In some cases, this can be a two-part inquiry: (1) whether the UE is physically capable of transmitting in the 600 MHz spectrum (e.g., has the correct hardware/software) and (2) whether the UE is capable of transmitting in a manner that conforms with the Whitespace rules. UEs capable of transmitting at 600 MHZ, but not modifying their transmission power or pattern, for example, may be limited to Tier(2) fallback. UEs capable of both transmitting at 600 MHZ and modifying its transmission power or pattern, on the other hand, are capable of using both Tier(2) and Tier(3) fallback. In some examples, the UE can send an RRC message to the base station including the capabilities of the UE.

When the UE is not 600 MHz capable, then at 312, the UE can send an error message to the base station. The error message can comprise a RRC message, for example, indicating the UE is not 600 MHz capable. In some examples, the RRC message can also request for the UE to be placed in queue for a primary frequency. At 314, in some examples, the UE can also play an error message for the user to inform the user that the call cannot be completed. This can include the conventional "We're sorry, your call cannot be completed at this time. Please try your call again later," a fast busy, or other indication to inform the user that the call has not gone through. In some examples, the UE can also set a timer to retry the call in a predetermined amount of time (e.g., 1, 3, 5, etc. seconds). This may prevent the UE from constantly pinging the base station, for example, to reduce wasted signaling, among other things.

When the UE is 600 MHz capable, on the other hand, then at 316, the UE can determine if a Tier(2) frequency pair has been received. The UE can receive, for example, a SIB message providing the 600 MHz frequency pair and instructions to use the frequencies in a normal manner. In this case, because the frequencies are (1) not being used by DTV and (2) licensed to the provider, the UE is free to use the frequencies at normal power levels and radiation patterns.

When a Tier(2) frequency pair is received, then at 318, the UE can reset the transceiver to the applicable frequencies, as necessary. To transmit in the 600 MHZ band, the UE may need to change the frequencies used by the existing transceiver or may need to switch to a second transceiver configured for 600 MHz communications. As discussed above, this may require a hardware solution, a software solution, or a firmware solution.

At 320, regardless of how the secondary frequencies are provided, the UE can establish the connection with the base station using the received 600 MHz frequency pair. In this configuration, where Tier(2) frequencies are available, performance may be substantially unaffected. In other words, because the UE is free to use the Tier(2) frequencies at full power, range, throughput, and other performance parameters may be minimally affected or unaffected.

When no primary or Tier(2) frequencies are available and the UE is Tier(3) capable (as discussed above), then at 322, the UE can determine whether it has received an unlicensed—or Tier(3)—frequency pair. As above, in some examples, receipt of a Tier(3) frequency pair may indicate that the base station has simply run out of more "preferred" frequencies such as primary and Tier(2) frequencies. In other examples, receipt of a Tier(3) frequency pair may be part of a frequency management scheme. In other words, while some primary or Tier(2) frequencies are available, the base station may nonetheless provide Tier(3) frequencies to manage bandwidth, reduce interference, etc. Tier(3) frequencies may be used for UEs that are particularly new (e.g. particularly technologically advanced with improved transceivers), close to the base station, or similar to reserve primary or Tier(2) frequencies for other UEs.

If a Tier(3) frequency pair is received then, at 324, the UE can (1) reset the transceiver to use the 600 MHz frequencies. As before, the UE may need to change the frequencies used by the existing transceiver or may need to switch to a second transceiver configured for 600 MHz communications. At 326, the UE can also reduce transmission power, change antennas, change transmission schemes, etc. to fall within the Whitespace rules. In other words, because the frequency is not licensed to the provider, the UE can only utilize Tier(3) frequencies by conforming to the Whitespace rules. Thus, the UE may need to switch to a more directional antenna, use beamforming, or other techniques to maintain the necessary power and emissions requirements.

Figure 4:
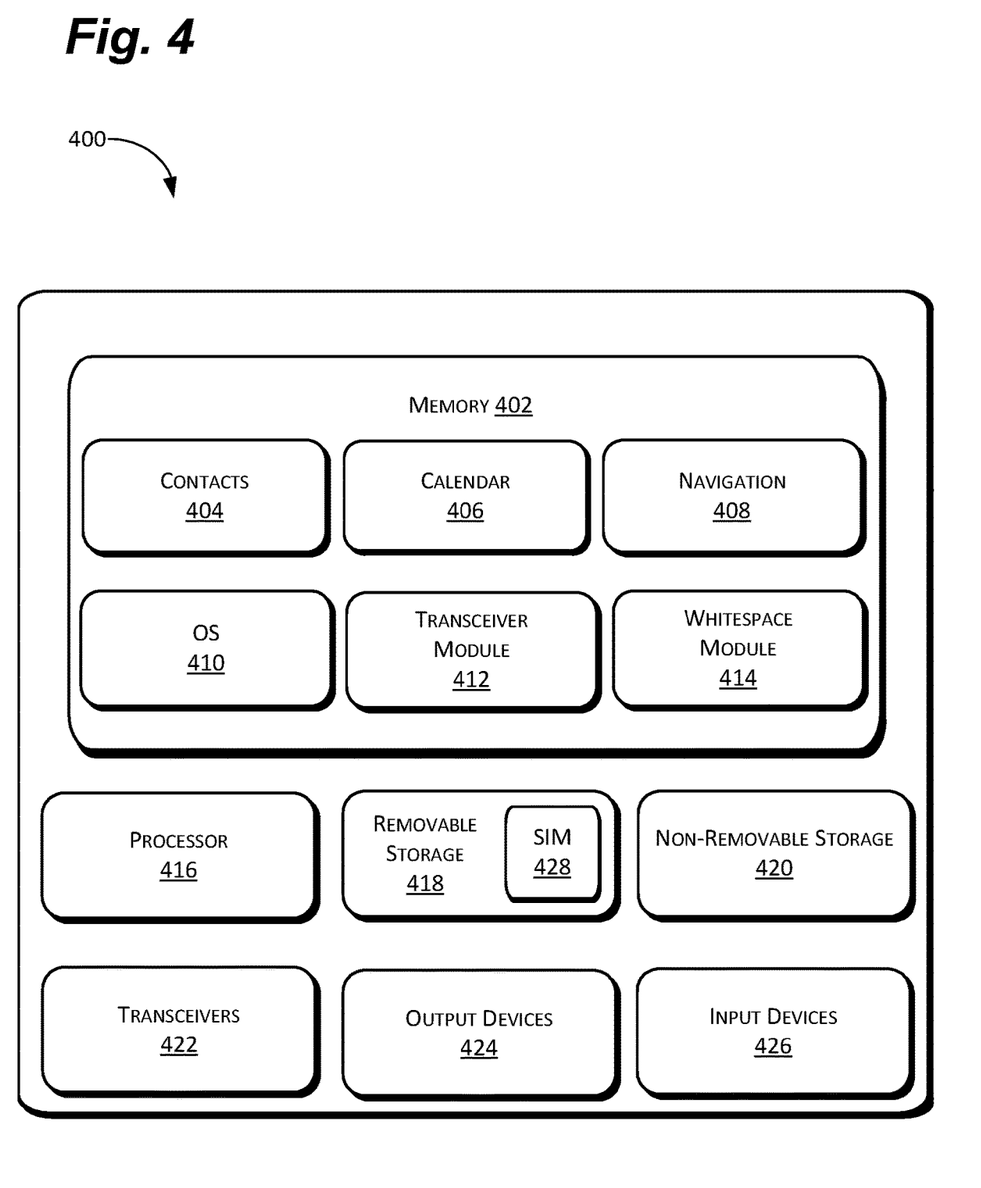
FIG. 4 is an example of a UE for use with the systems and methods disclosed herein, in accordance with some examples of the present disclosure.

FIG. 4 depicts a component level view of a UE for use with the systems and methods 200, 300 described herein. For clarity, the UE 400 is described herein generally as a cell phone or smart phone. One of skill in the art will recognize, however, that the methods 200, 300 described herein can also be used with a variety of other electronic devices, such as, for example, tablet computers, laptops, desktops, and other network (e.g., cellular or IP network) connected devices. These devices are referred to collectively as UE 400.

The UE 400 can comprise a number of components to execute the above-mentioned functions. As discussed below, the UE 400 can comprise memory 402 including many common features such as, for example, the contacts 404, calendar 406, navigation software 408, and the operating system (OS) 410. In this case, the UE can also comprise a transceiver module 412 and a Whitespace module 414. The UE 400 can also comprise one or more processors 416. The UE 400 can also include one or more of removable storage 418, non-removable storage 420, transceiver(s) 422, output device(s) 424, and input device(s) 426. In some examples, such as for cellular communication devices, the UE 400 can also include a subscriber identification module (SIM) 428 including an International Mobile Subscriber Identity (IMSI), and other relevant information.

In various implementations, the memory 402 can be volatile (such as random access memory (RAM)), non-volatile (such as read only memory (ROM), flash memory, etc.), or some combination of the two. The memory 402 can include all, or part, of the functions 404, 406, 408 and the OS 410 for the UE 400, among other things.

The memory 402 can also comprise contacts 404, which can include names, numbers, addresses, and other information about the user's business and personal acquaintances, among other things. In some examples, the memory 402 can also include a calendar 406, or other software, to enable the user to track appointments and calls, schedule meetings, and provide similar functions. In some examples, the memory 402 can also comprise navigation software 408 such as global positioning system (GPS) and/or cellular location based navigation systems. Of course, the memory 402 can also include other software such as, for example, e-mail, text messaging, social media, and utilities (e.g., calculators, clocks, compasses, etc.).

The memory 402 can also include the OS 410. Of course, the OS 410 varies depending on the manufacturer of the UE 400 and currently comprises, for example, iOS 10.3.2 for Apple products and Oreo for Android products. The OS 410 contains the modules and software that support a computer's basic functions, such as scheduling tasks, executing applications, and controlling peripherals.

In this configuration, the UE 400 can also comprise a transceiver module 412. The transceiver module 412 can comprise, for example, a software or firmware module capable of controlling the one or more transceivers 422, discussed below. Thus, the transceiver module 412 can provide commands to cause the transceiver(s) 422 to switch between primary and 600 MHz frequencies, for example.

The transceiver module 412 can also provide commands to cause the UE 400 to switch from a first transceiver of the one or more transceivers 422 to a second transceiver of the one or more transceivers 422.

The UE 400 can also comprise a Whitespace module 414. The Whitespace module 414 can include data representing the Whitespace rules and can ensure the UE 400 operates within the Whitespace rules when necessary (e.g., when using Tier(3) frequencies). Thus, the Whitespace module 414 can work in concert with the transceivers 422, antennas, and other components to reduce transmission power, increase directionality, or otherwise modify the transmissions of the UE 400. In some examples, the Whitespace module 414 may cause the one or more transceivers 422 to reduce power, for example, and switch from a first antenna to a second antenna to control overall transmission patterns based on the Whitespace rules.

The UE 400 can also comprise one or more processors 416. In some implementations, the processor(s) 416 can be a central processing unit (CPU), a graphics processing unit (GPU), or both CPU and GPU, or any other sort of processing unit. The UE 400 can also include one or more of removable storage 418, non-removable storage 420, transceiver(s) 422, output device(s) 424, and input device(s) 426. In some examples, such as for cellular communication devices, the UE 400 can also include a subscriber identification module (SIM) 428 including an International Mobile Subscriber Identity (IMSI), and other relevant information.

The UE 400 may also include additional data storage devices (removable and/or non-removable) such as, for example, magnetic disks, optical disks, or tape. Such additional storage is illustrated in FIG. 4 by removable storage 418 and non-removable storage 420. The removable storage 418 and non-removable storage 420 can store some, or all, of the functions 404, 406, 408, 412, 414 and/or OS 410.

The memory 402, removable storage 418, and non-removable storage 420 are all examples of non-transitory computer-readable media. Non-transitory computer-readable media may include volatile and nonvolatile, removable and non-removable tangible, physical media implemented in technology for storage of information, such as computer readable instructions, data structures, program modules, or other data. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 400. Any such non-transitory computer-readable media may be part of the UE 400 or may be a separate database, databank, remote server, or cloud-based server.

In some implementations, the transceiver(s) 422 include any sort of transceivers known in the art. In some examples, the transceiver(s) 422 can include wireless modem(s) to facilitate wireless connectivity with the other UE, the Internet, and/or an intranet via a cellular connection. Further, the transceiver(s) 422 may include a radio transceiver that performs the function of transmitting and receiving radio frequency communications via an antenna (e.g., Wi-Fi or Bluetooth®). In other examples, the transceiver(s) 422 may include wired communication components, such as a wired modem or Ethernet port, for communicating with the other UE or the provider's Internet-based network.

In this case, the transceiver(s) 422 can comprise either (1) a transceiver 422 capable of sending/receiving over a wider range of frequencies or (2) multiple transceivers 422 each capable of sending/receiving over a narrower range of frequencies. Thus, in some examples, a single transceiver 422 that can send/receive over a variety of primary and secondary frequencies, including the 600 MHz spectrum can be used. In other examples, the UE 400 can comprise a first transceiver 422a capable of sending/receiving on one or more primary frequencies and a second transceiver 422b capable of transmitting over at least the 600 MHz spectrum. As discussed above, changing frequencies, changing transceivers 422, changing power levels, changing antennas, and other functions can be controlled by the transceiver module 412, the Whitespace module 414, and/or the OS 410.

In some implementations, the output device(s) 424 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UE 400 is connected to a network, the type of call being received (e.g., video calls vs. voice calls), the number of active calls, etc. In some examples, the output device(s) 424 can provide a sound or message when the UE 400 is unable to connect to a base station, for example, or when the UE 400 uses a secondary frequency as opposed to a primary frequency. Output device(s) 424 also include ports for one or more peripheral devices, such as headphones, peripheral speakers, or a peripheral display.

In various implementations, input device(s) 426 include any sort of input devices known in the art. For example, the input device(s) 426 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

As discussed above, the methods 100, 200, 300 can also be used in conjunction with a base station, which can include a variety of electronic devices. As mentioned above, the various components of the methods 100, 200, 300 such as, for example, the frequency database discussed in FIGS. 1A and 1B can be included in the base station. Though an actual base station includes a number of components such as transceiver(s), antennas, routers, computers, etc., for ease of explanation, a base station is discussed below simply as a server 500, shown in FIG. 5. One of skill in the art will nonetheless recognize that the various components of the methods 200, 300 could be located in various other components of the cellular network or on a dedicated server. Thus, the server 500 is intended only to simplify the discussion and not to limit the disclosure. The server 500 can comprise, for example, a network entity (e.g., a Proxy-Call Session Control Function (PCSCF) or Policy Charging and Rules Function (PCRF)), a dedicated server, desktop, laptop, tablet, or another type of computing device.

Figure 5:
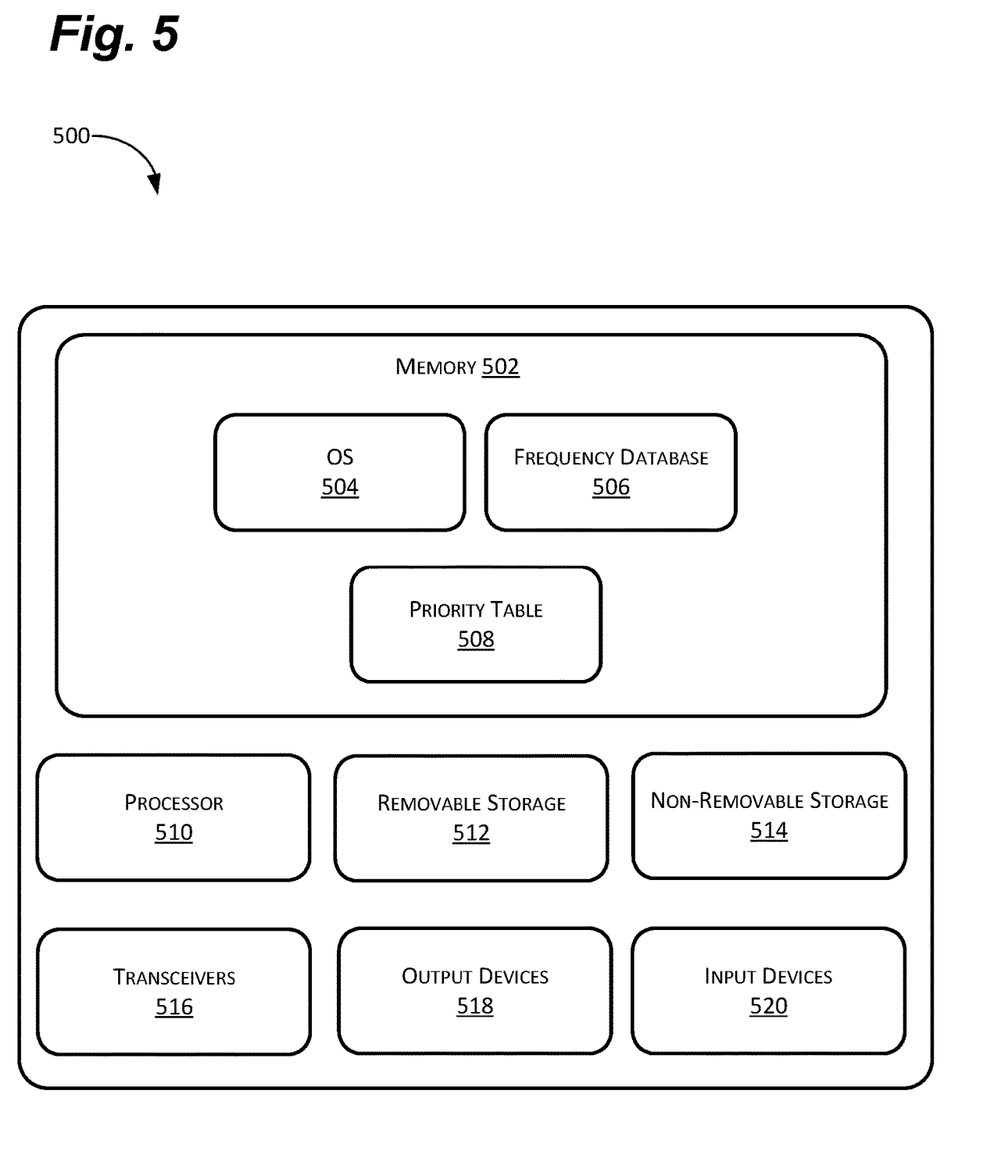
FIG. 5 is an example of a server for use with the systems and methods disclosed herein, in accordance with some examples of the present disclosure.

The server 500 can comprise a number of components to execute the above-mentioned functions and applications. As discussed below, the server 500 can comprise a memory 502 including many common features such as, for example, the OS 504, the frequency database 506, and a priority table 508. The server 500 can also comprise one or more processors 510. In some implementations, the processor(s) 510 can be a CPU, GPU, or both CPU and GPU, or any other sort of processing unit. The server 500 can also include one or more of removable storage 512, non-removable storage 514, transceiver(s) 516, output device(s) 518, and input device(s) 520.

In various implementations, the memory 502 can be volatile (such as RAM), non-volatile (such as ROM, flash memory, etc.), or some combination of the two. The memory 502 can include all, or part, of the functions of 506, 508 for the server 500, among other things. The memory 502 can also include the OS 504. Of course, the OS 504 varies depending on the manufacturer of the server 500 and the type of component. Many servers, for example, run Linux or Windows Server. Dedicated cellular routing servers may run a specific telecommunications OS. The OS 504 contains the modules and software that supports a computer's basic functions, such as scheduling tasks, executing applications, and controlling peripherals.

In some examples, the server can also comprise the aforementioned frequency database 506. The frequency database 506 can contain an up-to-date version of all of the frequencies available to the base station. This can include both primary and secondary frequencies. With respect to the secondary frequencies, it can also include all of the tiers of secondary frequencies. The frequency database 506 may also include the rules associated with each tier (e.g., don't use, use, use with Whitespace, etc.) to ensure each frequency is used in the appropriate manner.

In some examples, the server 500 can also include a priority table 508. As discussed above, in some examples, the base station can assign frequencies to UEs 400 based on their distance from the base station, their line-of-sight, and other factors. To this end, the priority table 508 can contain a list of the UEs 400 connected to the base station, their current distance from the base station or position, signal strength or quality, and other data useful for setting their priority. The base station can then assign higher priority (e.g., primary frequencies) to the UEs 400 that are the farthest away or have the lowest signal strength and lower priority (or secondary frequencies) to UEs 400 that are close the base station and/or have high signal strength, among other things.

The server 500 may also include additional data storage devices (removable and/or non-removable) such as, for example, magnetic disks, optical disks, or tape. Such additional storage is illustrated in FIG. 5 by removable storage 512 and non-removable storage 514. The removable storage 512 and non-removable storage 514 can store some, or all, of the OS 504 and functions 506, 202.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 500. Any such non-transitory computer-readable media may be part of the server 500 or may be a separate database, databank, remote server, or cloud-based server.

In some implementations, the transceiver(s) 516 include any sort of transceivers known in the art. In some examples, the transceiver(s) 516 can include wireless modem(s) to facilitate wireless connectivity with the other UE, the Internet, and/or an intranet via a cellular connection. Further, the transceiver(s) 516 may include a radio transceiver that performs the function of transmitting and receiving radio frequency communications via an antenna (e.g., Wi-Fi or Bluetooth®). In other examples, the transceiver(s) 516 may include wired communication components, such as a wired modem or Ethernet port, for communicating with the other UE or the provider's Internet-based network.

In some implementations, the output device(s) 518 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the server 500 is connected to a network, the type of call being received (e.g., video calls vs. voice calls), the number of active calls, etc. Output device(s) 518 may also include ports for one or more peripheral devices, such as headphones, peripheral speakers, or a peripheral display.

In various implementations, input device(s) 520 include any sort of input devices known in the art. For example, the input device(s) 520 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the server 500 and/or by the UE 400, other components could perform the same or similar functions without departing from the spirit of the invention. In addition, while the disclosure is primarily directed to the 600 MHz spectrum, it is equally applicable to other frequency spectrums that become available that have the same, or similar, limitations on use.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving, at a transceiver of a base station, a request from a user equipment (UE) to connect to the base station, the request including radio frequency bands that are supported by the UE;
   determining, by a processor of the base station, that a primary frequency pair is not available for the UE;
   determining, by the processor of the base station, that the UE is within a predetermined distance of the base station;
   determining, by the processor of the base station, that at least one secondary frequency pair is available;
   determining that the at least one secondary frequency pair is not being utilized by a digital television (DTV) station; and sending, by the transceiver of the base station and responsive to determining that the at least one secondary frequency pair is not being utilized by the DTV station and that the UE is within the predetermined distance of the base station, a first message to the UE to determine whether the UE is capable of communicating in a secondary frequency spectrum.

2. The method of claim 1, further comprising:
receiving, at the transceiver of the base station, a response from the UE indicating the UE is capable of communicating in the secondary frequency spectrum; and
sending, by the transceiver of the base station, a second message to the UE including at least the at least one secondary frequency pair.

3. The method of claim 2, wherein determining that the at least one secondary frequency pair is available further comprises retrieving the at least one secondary frequency pair from a frequency database stored in a memory of the base station.

4. The method of claim 3, further comprising:
determining, by the processor of the base station, that the at least one secondary frequency pair is licensed to a provider associated with the base station.

5. The method of claim 2, wherein determining that at least one secondary frequency pair is available comprises:
retrieving the at least one secondary frequency pair from a frequency database stored in a memory of the base station; and
determining, by the processor of the base station, that the at least one secondary frequency pair is not licensed to a provider associated with the base station;
wherein the second message further comprises instructions for the UE to transmit at a reduced power level when compared to power levels used on the primary frequency pair.

6. The method of claim 1, further comprising:
receiving, at the transceiver of the base station, a response from the UE indicating that the UE is not capable of communicating in the secondary frequency spectrum; and
sending, by the transceiver of the base station, a second message to the UE including an error code indicating that the request to connect cannot be completed.

7. The method of claim 1, where in the at least one secondary frequency pair is included in a 600 MHz frequency spectrum, the 600 MHz frequency spectrum including from 617 MHz to 652 MHz and 663 MHz to 698 MHz.

8. A base station comprising:
one or more transceivers to send and receive one or more wireless transmissions;
memory storing at least a frequency database; and
one or more processors in communication with at least the one or more transceivers and the memory, the memory including computer executable instructions to cause the one or more processors to:
receive, with the one or more transceivers, a request to connect to the base station from a user equipment (UE);
determine, with the one or more processors, that a primary frequency pair is not available;
determine, with the one or more processors, that the UE is within a predetermined distance of the base station;
determine, with the one or more processors, that at least one secondary frequency pair stored in the frequency database is available;
determining that the at least one secondary frequency pair is not being utilized by a digital television (DTV) station; and
send, with the one or more transceivers and responsive to determining that the at least one secondary frequency pair is not being utilized by the DTV station and that the UE is within the predetermined distance, a first message to the UE inquiring whether the UE is capable of communicating in a secondary frequency spectrum.

9. The base station of claim 8, the computer executable instructions further causing the one or more processors to:
receive, with the one or more transceivers, a second message indicating the UE is not capable of communicating in the secondary frequency spectrum; and
send, with the one or more transceivers, a third message to the UE indicating that the base station cannot complete the request to connect to the base station.

10. The base station of claim 8, the computer executable instructions further causing the one or more processors to:
receive, with the one or more transceivers, a second message indicating the UE is capable of communicating in the secondary frequency spectrum; and
send, with the one or more transceivers, a third message to the UE providing at least a frequency pair in the secondary frequency spectrum to enable the UE to connect to the base station.

11. The base station of claim 8, wherein the frequency database comprises:
a first plurality of frequencies in the secondary frequency spectrum that are not available for use by the base station;
a second plurality of frequencies in the secondary frequency spectrum that are licensed to a provider associated with the base station and are available for use by the base station; and
a third plurality of frequencies in the secondary frequency spectrum that available for use by the base station under one or more Whitespace rules.

12. The base station of claim 11, wherein the first plurality of frequencies comprises:
frequencies in use by one or more digital television (DTV) stations, and/or
frequencies that are licensed to a licensee not associated with the base station for which a certificate of operation has been filed.

13. The base station of claim 11, wherein the third plurality of frequencies comprises:
frequencies that are licensed to one or more licensees not associated with the base station for which no certificate of operation has been issued, that are not in use by a secondary television related service; and/or
frequencies that are licensed to one or more licensees not associated with the base station for which no certificate of operation has been issued, that are in use by a secondary television related service, where the use by the secondary television related service can be stopped by an issuance of a certificate of operation for an adjacent frequency licensed to the provider.

14. The base station of claim 11, the computer executable instructions further causing the one or more processors to:
receive, with the one or more transceivers, a second message indicating the UE is capable of communicating in the secondary frequency spectrum;
determine, with the one or more processors, that a frequency pair in the second plurality of frequencies of the frequency database is available; and
send, with the one or more transceivers, a third message to the UE providing at least the frequency pair in the second plurality of frequencies to enable the UE to connect to the base station.

15. The base station of claim 11, the computer executable instructions further causing the one or more processors to:
   receive, with the one or more transceivers, a second message indicating the UE is capable of communicating in the secondary frequency spectrum;
   determine, with the one or more processors, that a frequency pair in the third plurality of frequencies of the frequency database is available; and
   send, with the one or more transceivers, a third message to the UE providing at least:
   the frequency pair to enable the UE to connect to the base station; and
   instructions to use a reduced power level when compared to a power level used for the second plurality of frequencies of the frequency database.

16. A system comprising:
   a base station comprising:
   one or more transceivers to send and receive one or more wireless transmissions;
   memory storing at least a frequency database; and
   one or more processors in communication with at least the one or more transceivers and the memory, the memory including computer executable instructions to cause the one or more processors to:
   receive, with the one or more transceivers, a request to connect to the base station from a user equipment (UE);
   determine, with the one or more processors, that a primary frequency pair is not available;
   selecting, with the one or more processors and based at least in part on a distance that the UE is from the base station, at least one secondary frequency pair stored in the frequency database that is included in a 600 MHz frequency spectrum;
   determining that the at least one secondary frequency pair is not being utilized by a digital television (DTV) station; and
   sending, with the one or more transceivers and in response to determining that the at least one secondary frequency pair is not being utilized by the DTV station, a first message to the UE inquiring whether the UE is capable of communicating in a secondary frequency spectrum.

17. The system of claim 16, wherein in the at least one secondary frequency pair is included in a frequency spectrum from 617 MHz to 652 MHz and 663 MHz to 698 MHz.

18. The system of claim 16, wherein the request comprises a radio resource control connection and includes radio frequency bands that are supported by the UE.

19. The system of claim 16, further comprising:
   determining that the UE is within a predetermined distance of the base station; and
   determining that the UE can utilize the at least one secondary frequency pair in response to determining that the UE is within the predetermined distance.

20. The system of claim 16, wherein the at least one secondary frequency pair is selected based on a type of service requested from the UE or a type of the UE.

* * * * *